United States Patent [19]

Anderson

[11] Patent Number: 5,073,577

[45] Date of Patent: Dec. 17, 1991

[54] MIXED EMULSION OF A LIQUID POLYSULFIDE AND DISPENSION OF AN OXIDATIVE CURATIVE THEREFOR

[75] Inventor: Paul H. Anderson, Elgin, Ill.

[73] Assignee: Morton International, Inc., Chicago, Ill.

[21] Appl. No.: 537,189

[22] Filed: Jun. 11, 1990

[51] Int. Cl.$^5$ ...................... C08J 77/00; C08K 77/00; C08L 77/00
[52] U.S. Cl. .................................... 524/609; 524/800; 524/801; 528/374
[58] Field of Search ...................... 524/609, 800, 801; 528/374

[56] References Cited

U.S. PATENT DOCUMENTS 4,098,736 7/1978 Li et al. ............................... 524/609
4,177,177 12/1979 Vanderhoff et al. ............... 524/609

Primary Examiner—Harold D. Anderson
Assistant Examiner—T. Mosley
Attorney, Agent, or Firm—Wayne E. Nacker; Gerald K. White

[57] ABSTRACT

Stable mixed emulsion/dispersions of a liquid polysulfide and an oxidative curative therefor are provided. The liquid polysulfide is emulsified in water using a surfactant with a hydrophile/lipophile balance of between 18 and 20. Particulates of an oxidative curative are separately dispersed with surfactants in water. The emulsions and dispersion are then blended together.

9 Claims, No Drawings ic curative, (C) between about 3 and about
MIXED EMULSION OF A LIQUID POLYSULFIDE AND DISPENSION OF AN OXIDATIVE CURATIVE THEREFOR This invention relates to stable mixed emulsions of liquid polysulfides and dispersions or curatives therefor, which mixed emulsion/dispersions are useful as sealants.

BACKGROUND OF THE INVENTION

Liquid polysulfide and liquid polysulfide compositions are well known, having been described, for example in U.S. Pat. Nos. 3,331,782; 4,060,570; 3,852,214; 3,817,930; 3,770,678; 3,637,574; 3,518,211; 3,518,107; 3,349,047 and 2,466,936. Generally, liquid polysulfide polymers are materials having the structure HS(RSS—R'—SS)$_x$R"SH wherein R, R' and R" may be the same or different hydrocarbon, oxyhydrocarbon or thiahydrocarbon moieties. These polymers are generally linear, but may be branched, for example, by preparing these compositions with trichloropropane.

Liquid polysulfides are curable with a variety of oxidative curatives, particularly inorganic oxides and peroxides. Oxidative curatives link polysulfide polymers together by oxidation of terminal thio (—SH) groups to form disulfide (—S—S—) linkages. Examples of suitable curatives are given in U.S. Pat. No. 3,331,782, the teachings of which are incorporated herein by reference. Cured polysulfides in combination with various fillers, pigments, plasticizers etc. are useful, for example, as sealants and caulking materials. The molecular weights of polysulfides may vary over a wide range, e.g., from 500 to upwards of 25,000. Typically, high molecular weight polysulfides are produced, and then the molecular weight is adjusted downward by a split stripping process. This process also provides the free terminal thio moieties. Typically, commercial liquid polysulfides have molecular weights in the 1000 to 10,000 range.

As described in referenced U.S. Pat. No. 3,331,782, liquid polysulfides are generally provided in a two-package system with the polysulfide material separately packaged from the curative. The curative is typically provided as a paste that is added to the liquid polysulfide material at the time of use. The high reactivity of liquid polysulfides with the curative, particularly when the curative is a peroxide, has generally precluded these components from being packaged in a one-package system.

Two-package systems are inherently disadvantageous relative to one-package systems. The need to mix at the site of application is at least an inconvenience for the user. Inadequate or improper mixing may result in an unsatisfactory cured product. The lack of mixing apparatus and/or the inconvenience of mixing may cause a potential user to seek an alternative sealing or caulking material. It is therefor a general object of the present invention to provide a one-package composition containing both polysulfide and an oxidative curative therefor.

There have been produced one-package mixtures of polysulfides and inorganic curatives in which premature curing is prevented by complete removal of water from the system. This type of system relies of absorption of water vapor from the atmosphere for eventual curing. A major disadvantage of such a system is the inordinately long cure time. Typically, such a system requires at least about 24 hours to become tack-free and much longer to completely cure. Such extended cure times are unacceptable for many sealing and caulking applications.

It is also known to produce polysulfide latexes in which liquid polysulfides are emulsified in an aqueous medium. Such latexes are described, for example in U.S. Pat. No. 3,770,678. These latexes do not contain an oxidative curative, but rather attain their final physical properties through coalescence of the latex particles upon evaporation of solvent or water.

BRIEF DESCRIPTION OF THE INVENTION

This invention provides a one-package composition in which a liquid polysulfide is emulsified, through use of an appropriate surfactant, in an aqueous medium; and inorganic oxidative curative particles are dispersed, through use of an appropriate surfactant, in the aqueous medium. The one-package composition comprises: (A) between about 50 and about 70 wt. percent of the liquid polysulfide, (B) between about 5 and about 10 wt. percent oxidative curative, (C) between about 3 and about 7 wt. percent surfactant(s), and (D), balance water. The polysulfide is emulsified with a suitable surfactant in an aqueous solution. The oxidative curative particulates are separately dispersed with an appropriate surfactant. The emulsification of liquid polysulfide and dispersion of curative particulates are then mixed together. Additional components, such as fillers, colorants, etc. may also be mixed with the emulsified polysulfide and dispersed curative particulates.

DETAILED DESCRIPTION OF CERTAIN PREFERRED EMBODIMENTS

Herein, unless otherwise noted, all percentages are by weight. Unless otherwise noted, all weight percentages are relative to the total weight of (A) the polysulfide, (B) the curative, (C) the surfactant(s) and (D) the water.

The liquid polysulfides useful in the invention include —SH—terminated polysulfides described in the above-mentioned patents, the teachings of which are incorporated herein by reference, including branched and straight-chain polymers. All molecular weights of liquid polysulfides are considered useful for the present invention, although polysulfides having molecular weights in the 1000–10,000 range are preferred.

Inorganic curatives include inorganic oxides such as ZnO, PbO, MgO, CaO, BaO, FeO, $Fe_2O_3$, CoO and CuO; inorganic peroxides such as $ZnO_2$, $MgO_2$, $CaO_2$, $MnO_2$, $TeO_2$, $SeO_2$, $FeO_2$, $As_2O_3$, $Sb_2O_3$, $Sb_2O_5$, $SnO_2$ and $Pb_3O_4$; and inorganic oxidizing agents such as $Na_2Cr_2O_7$, $K_2Cr_2O_7$ and $(NH_4)_2Cr_2O_7$. Inorganic peroxides, such as $CaO_2$ are preferred.

It is found that the choice of the surfactant used to emulsify the liquid polysulfide is critical to establishing a stable mixed emulsion of the liquid polysulfide and dispension of the oxidative curative. In particular, it is found that the surfactant used to emulsify the liquid polysulfide should have a hydrophile/lipophile balance (HLB) of between about 18 and about 20. Measurements of HLB are described in a publication entitled *THE HLB SYSTEM* of ICI Americas Inc., Wilmington, Del. 19897, 1984.

Preferred surfactants for emulsifying the liquid polysulfide are block copolymers, particularly block copolymers of the ABA configuration, in which more hydrophillic "A" blocks flank a more hydrophobic "B" block. One suitable type of block copolymer comprises polyethylene oxide blocks flanking a more hydrophobic block of polypropylene oxide. Such block polymer surfactants are sold by BASF Wyandotic Corporation under the tradename Pluronic.

The amount of surfactant required for emulsification of the liquid polysulfide in water is at least about 3.5 wt. percent relative to the polysulfide; however, it is preferred to use higher amounts, e.g., up to about 10 wt. percent relative to the polysulfide to ensure stability of the polysulfide in the presence of dispersed oxidative curative particulates.

The choice of surfactant used for dispersing the particulates of oxidative curative is considered less critical than the choice of that which must be used for emulsifying the liquid polysulfide. Generally, the surfactant used for dispersing the oxidative curative particulates is one having a straight hydrocarbon chain and a hydrophyllic end group, e.g., sodium lauryl sulfate.

The final necessary ingredient in the mixed emulsions of the present invention is water (or an aqueous solution). The water maintains separation between the emulsified liquid polysulfide and the dispersed particulates of oxidative curative, preventing them from reacting. Eventual removal of the water, i.e., by evaporation, destroys the emulsification of the liquid polysulfide and the dispersion of the oxidative curative and allows the oxidative curative to react with the terminal thio groups on the liquid polysulfide and thereby effect the cure. Generally, at least about 20 wt. percent water is necessary to maintain a mixed emulsion.

The mixed emulsion/dispersion by itself is a viscous flowable material suitable for use as a sealant. However, the emulsion/dispersion can also be thickened into a paste by the addition of appropriate fillers. Such thickened formulations are useful, for example, as caulks. Suitable fillers, for example, include $TiO_2$, carbon black, calcium carbonate, clays and limestone.

The mixed emulsion/dispersion may also include plasticizers for plasticizing the polysulfide composition when it is eventually cured. Generally, such plasticizers are hydrophobic plasticizers known in the art. These are admixed with the liquid polysulfide prior to emulsification. Suitable plasticizers include chlorinated plasticizers, such as chlorinated biphenyl and chlorinated paraffin, and plasticizers sold under the trade names Santicizer 160, 261 and 278 by Monsanto.

The composition may also contain a variety of additional components as is known in the art, such as whitners, pigments, latex stabilizers, etc.

To prepare the mixed emulsion/dispersions of the present invention, an emulsions of the liquid polysulfide is prepared and a dispersion of curative particulates is prepared separately. The polysulfide is admixed with any plasticizer, and the plasticizer and the surfactant for the polysulfide is added to an aqueous solution; high shear, such as that provided by an homoginizer is used to prepare the emulsion. This emulsion of polysulfide typically contains between about 50 and about 70 wt. percent liquid polysulfide, between about 3.5 and about 10 wt. percent surfactant, balance water, calculated relative to the total weight of polysulfide, surfactant and water. Some heat, e.g., to provide a temperature in the range of about 40°-50° C., facilitates emulsion.

In a similar manner, oxidative curative particulates, surfactant and water are mixed and a dispersion (or cure paste) formed. The shear needed to disperse the particulates may be somewhat less than that required to emulsify the liquid polysulfide. This dispersion contains between about 40 and about 60 wt. percent particulates, between about 0.5 and about 5 wt. percent surfactant, balance water, calculated relative to the total weight of particulates, surfactant and water.

After separately preparing the emulsion and dispersion, they are mixed together, using sufficiently low shear so as not to deemulsify the liquid polysulfide or destroy the dispersion of the particulates of curative. In this step, additional ingredients, such as fillers, may be added. It is preferable that any filler have rheological properties similar to that of the emulsified curative particulates.

That a mixed emulsion/dispersion of liquid polysulfide and oxidative curative should be stable is surprising, because such flowable one-package compositions have long been sought, yet never achieved.

The invention will now be described in greater detail in terms of specific examples.

EXAMPLE 1

| Liquid Polysulfide Emulsion | |
|---|---|
| LP-12 (liquid polysulfide MW 4000) | 51.67 |
| Santicizer 160 (plasticizer) | 15.52 |
| Pluronic F-88 (surfactant) | 3.90 |
| Pluronic P-105 (surfactant) | 1.29 |
| Water | 25.65 |
| | 100.00 |
| Cure Paste (CaO Emulsion) | |
| Water | 44.00 |
| Tamol 731-SD (surfactant) | 1.00 |
| $CaO_2$ | 55.00 |
| | 100.00 |
| Blend | |
| Emulsion | 49.25 |
| 2-Mercaptoethanol (Chain stop agent to produce a soft rubber) | 0.04 |
| Tamol 731-SD | 0.33 |
| Titanox 2101 ($TiO_2$ filler) | 7.63 |
| Gamasperse 255 ($CaCO_3$ filler) | 38.17 |
| Cure Paste | 4.58 |

Both the Liquid Polysulfide emulsion and the Cure paste are prepared using high shear. The Liquid polysulfide emulsion and additional ingredients (except for the cure paste) are then mixed together at high shear. Finally, the cure paste is added in a low shear mix.

The physical properties of the cured rubber-like sealant are as follows:

| Physical Properties | |
|---|---|
| Hardness | 50 (Shore A) |
| Tensile | 73.1 psi |
| 100% modulus | 71.8 psi |
| Ultimate Elongation | 239% |

EXAMPLE 2

A black coating is produced containing as follows:

| Liquid Polysulfide Emulsion | |
|---|---|
| LP-32 (liquid polysulfide MW 4000) | 67.00 |
| Pluronic F-88 | 3.00 |
| Pluronic P-105 | 1.00 |
| Santicizer 261 | 3.35 |
| Water | 25.65 |
| | 100.00 |
| Cure Paste | |
| Water | 42.00 |
| $MnO_2$ (Eagle Picher G) | 57.00 |

| -continued | |
|---|---|
| Tamol 731SD | 1.00 |
| Blend | |
| Emulsion | 56.07 |
| Marasperse CBOS-4 (dispersant for carbon black) | 0.75 |
| Raven 420 (carbon black) | 18.69 |
| 2-Mercaptoethanol (chain stopper) | 0.07 |
| Water | 17.88 |
| Cure Paste | 6.54 |

The coating is prepared in the manner of the Sealant of Example 1.

The physical properties of the coating are as follows:

| Physical Properties | |
|---|---|
| Hardness | 66 (Shore A) |
| Tensile | 470 psi |
| 100% modulus | 199 psi |
| 200% modulus | 270 psi |
| 300% modulus | 330 psi |
| Ultimate Elongation | 540% |

An advantage of the emulsion/dispersions of the present invention is that they can be thinned with water. This is particulary important for spray applications where the viscosity must be reduced sufficiently for the compositions to pass through applicator nozzles. Previously, compositions containing liquid polysulfides and oxidatives curative particulates were thinned with organic solvents.

While the invention has been described in terms of certain preferred embodiments, modifications obvious to one with ordinary skill in the art may be made without departing from the scope of the present invention.

Various features of the invention are set forth in the following claims.

What is claimed is:

1. A stable mixed emulsion and dispersion comprising:
   a. water as a continuous aqueous phase,
   b. polysulfide emulsified with surfactant within said continuous aqueous phase and
   c. particulates of an oxidative curative for said polysulfide separately dispersed with surfactant within said aqueous phase,
   based upon the total weight of polysulfide, oxidative curative surfactant(s) and water, said liquid polysulfide comprising between about 50 and about 70 wt. percent, said oxidative curative comprising between about 5 and about 10 wt. percent, said surfactant(s) comprising between about 3 and about 7 wt. percent, and said water comprising at least about 20 wt. percent.

2. A mixed emulsion according to claim 1 wherein the surfactant in which said polysulfide is emulsified has a hydrophile/lipophile balance of between about 18 and about 20.

3. A mixed emulsion according to claim 1 wherein the surfactant in which said liquid polysulfide is emulsified in a block copolymer having more hydrophillic blocks flanking a more hydrophobic block.

4. A mixed emulsion according to claim 1 wherein said surfactant in which said liquid polysulfide is emulsified comprises polyethylene oxide blocks flanking a polypropylene oxide block.

5. A mixed emulsion according to claim 1 wherein said emulsified liquid polysulfide contains a hydrophobic plasticizer.

6. A mixed emulsion according to claim 1 containing inorganic fillers to thicken the same.

7. A mixed emulsion according to claim 1 wherein the surfactant used to emulsify said particulates of oxidative curative comprises a straight hydrocarbon chain and a hydrophillic end moiety.

8. A method of preparing a stable mixed emulsion of a liquid-polysulfide and a dispersion of an oxidative curative therefor, the method comprising:
   mixing liquid polysulfide, water and a surfactant with shear sufficiently high to produce an emulsion of the polysulfide in water,
   mixing oxidative curative particulates, water and a surfactant with shear sufficiently high to produce a dispersion of the oxidative curative particulates in water, and
   blending said liquid polysulfide emulsion with said oxidative curative dispersion with sufficiently low shear to maintain both the liquid polysulfide emulsion and dispersed oxidative curative particulates out of chemical contact with each other.

9. A method according to claim 8 wherein said said surfactant with which said polysulfide is emulsified has a hydrophile/lipophile balance of between about 18 and about 20.

* * * * *